United States Patent [19]

Colas et al.

[11] Patent Number: 5,091,484
[45] Date of Patent: Feb. 25, 1992

[54] ELASTOMER-FORMING COMPOSITIONS COMPRISING ALKOXYLATED MQ RESINS AND POLYDIORGANOSILOXANES

[75] Inventors: André R. L. Colas, Glashuetten; Klaus M. Geilich, Wiesbaden, both of Fed. Rep. of Germany

[73] Assignee: Dow Corning GmbH, Wiesbaden, Fed. Rep. of Germany

[21] Appl. No.: 463,189

[22] Filed: Jan. 10, 1990

[30] Foreign Application Priority Data

Feb. 1, 1989 [GB] United Kingdom ............... 8902183

[51] Int. Cl.$^5$ ........................................... C08F 283/00
[52] U.S. Cl. .................... 525/477; 525/479; 528/33; 528/17
[58] Field of Search ............... 525/477, 479; 528/33, 528/17

[56] References Cited

U.S. PATENT DOCUMENTS

| | | | |
|---|---|---|---|
| 3,647,846 | 3/1972 | Hartlein et al. | 26/448.2 |
| 3,884,866 | 5/1975 | Jeram et al. | 260/32.8 SB |
| 3,957,713 | 5/1976 | Jeram et al. | 260/32.8 SB |
| 4,143,088 | 3/1979 | Favre et al. | 260/825 |
| 4,737,562 | 4/1988 | Chaudhury et al. | 528/33 |
| 4,753,977 | 6/1988 | Merrill | 525/477 |
| 4,772,675 | 9/1988 | Klosowski et al. | 528/33 |
| 4,774,310 | 9/1988 | Butler | 528/23 |
| 4,962,174 | 10/1990 | Bilgrien et al. | 528/33 |
| 4,965,333 | 10/1990 | Inouye et al. | 528/33 |
| 4,973,644 | 11/1990 | Onishi et al. | 528/33 |

FOREIGN PATENT DOCUMENTS 553510 2/1958 Canada ........................... 525/477

*Primary Examiner*—Melvyn I. Marquis
*Assistant Examiner*—Margaret W. Glass
*Attorney, Agent, or Firm*—Roger H. Borrousch

[57] ABSTRACT

This invention discloses elastomer-forming compositions which have a low viscosity in the uncured state while retaining good physical properties when cured. They comprise an $\alpha,\omega$ hydroxyl, trialkoxy or alkylene-trialkoxy end-blocked polydiorganosiloxane, a MQ silicone resin having tetrafunctional units of the formula $SiO_2$ and monovalent units of the formula $R_aR'_{3-a}SiO_{\frac{1}{2}}$ wherein $R'$ denotes a group of the general formula $-R''Si(OR^*)_3$, with $R''$ being an alkylene group and $R^*$ an alkyl group and wherein $a$ has a value of 2 or 3, preferably 2 for up to 30% of all monovalent units and a titanium catalyst.

12 Claims, No Drawings

ELASTOMER-FORMING COMPOSITIONS COMPRISING ALKOXYLATED MQ RESINS AND POLYDIORGANOSILOXANES

This invention is concerned with elastomer-forming compositions and especially with silicone elastomer-forming compositions comprising certain organosilicon compounds having alkoxy groups.

Silicone elastomer-forming compositions which comprise alkoxy functional organosilicon compounds are known. Such compounds are used e.g. as crosslinking agents in compositions containing polydiorganosiloxanes having silanol groups in the terminal siloxane units of the polymer. These crosslinking agents are usually tri- or tetra-alkoxy silanes or short chain polydiorganosiloxanes having three or more silicon-bonded alkoxy groups. In order to give the elastomer-forming compositions sufficient strength when formed into elastomers one or more reinforcing additives are usually included. Suitable additives include reinforcing fillers, for example silica, polysilicates and resins. Resins which are useful include the so-called MQ resins consisting essentially of monofunctional (M) and tetrafunctional (Q) siloxane units said resins having residual Si-OH groups.

G.B. Patent Specification 1 523 105 describes an organosilicon composition which comprises a mixture of certain $\alpha, \omega$, dihydroxy diorganosiloxane polymers, an organosilicon MQ resin having alkyl, halogenoalkyl, vinyl or phenyl substituents linked to the silicon atoms, certain alkoxylated organosilicon monomers or polymers (e.g. polysilicates), an organic derivative of titanium and optionally fillers. The use of fairly large amounts of filler or resin, e.g. 5 to 50% by weight based on the total weight of the composition, results in compositions with high viscosity. These compositions are useful in certain applications, e.g as sealants although their high viscosity tends to make the manufacture and manipulation of the elastomer-forming compositions more difficult. In certain applications a low viscosity composition is preferred, e.g. where self levelling of the compositions is desired. A reduced viscosity could be achieved by decreasing the amount of reinforcing filler used but this results in an elastomer with greatly inferior physical properties. Compositions which have been developed for applications where self levelling is required, however, still tend to suffer from pseudo-plasticity effects, thus not always providing the amount of self levelling which is desired. Another method of reducing the viscosity of the uncured composition is to include solvent therein. This solution however causes the composition to shrink upon curing. It also causes the release of solvent into the atmosphere which is an environmental concern.

We have now found that the use of certain alkoxy functional MQ resins in certain elastomer-forming organosilicon compositions can provide uncured compositions with an acceptable flowability, without negatively affecting the physical properties of the cured elastomer. The MQ resin can serve both as crosslinker and as reinforcing agent, thereby eliminating the need for extra fillers or crosslinking agents although such components may be added to adapt the composition for particular applications.

Accordingly this invention provides an organosilicon elastomer-forming composition which comprises (i) a diorganopolysiloxane of which each terminal group has the formula $-Si(Z)_2Q$ wherein each Z denotes an organic group consisting of C, H and optionally O atoms, and Q is selected from the group consisting of $-OH$, $-OSi(OR^*)_3$, $-R''Si(OR^*)_3$ and $-R''-Si(Z)_2R''-Si(OR^*)_3$ wherein R'' is a divalent alkylene group having up to 10 carbon atoms in the chain linking the two silicon atoms together and $R^*$ denotes an alkyl group having from 1 to 8 carbon atoms, (ii) a MQ resin which consist essentially of units of the general formulae $R_aR'_{3-a}SiO_{\frac{1}{2}}$ and $SiO_{4/2}$, wherein R denotes an alkyl or aryl group having from 1 to 8 carbon atoms, R' is a group of the general formula $-R''Si(OR^*)_3$ wherein R'' and $R^*$ are as defined above and a has a value of 2 or 3, provided that at least one R' group is present per molecule and (iii) a titanium compound.

Component (i) polymers of the compositions of the invention include well known and commercially available materials. These polymers are diorganosiloxanes with each terminal group having a general formula $-Si(Z)_2Q$. The diorganopolysiloxanes in which Q is a hydroxyl group have the general structure $HO(SiZ_2O)_nH$. These diorganopolysiloxanes are well known and their manufacturing methods has been described in a number of different patents, for example G.B. Patent Specification 784 424, 889 937, 1 506 734. Diorganopolysiloxanes in which the Q group is a group of the formula $-OSi(OR^*)_3$ can be prepared, for example, from hydroxyl end-blocked diorganopolysiloxanes described above by condensation reaction with silanes of the formula $HOSi(OR^*)_3$ in the presence of a suitable catalyst, for example a tin catalyst. Diorganopolysiloxanes in which the Q group is $-R''Si(OR^*)_3$ or $R''Si(Z)_2OSi(Z)_2R''Si(OR^*)_3$ are described for example in U.S. Pat. No. 4,652,624 and can easily be prepared for example from polymers which are end-blocked with silicon-bonded alkylene groups by reacting these polymers in the presence of an addition catalyst, for example a Pt compound or complex, with a compound of the respective formulae $HSi(OR^*)_3$ or $HSi(Z)_2OSi(Z)_2R'-Si(OR^*)_3$. In the polymers of the invention each Z independently denotes an organic substituent consisting of C, H and optionally O atoms. Preferably Z is an alkyl or aryl group having up to 18 carbon atoms and most preferably all Z groups are methyl groups. n is an integer which may vary in order to give polymers which have a viscosity of from $10^{-4}$ m$^2$/s to 10m$^2$/s, preferably from $10^{-3}$ m$^2$/s to 0.1 m$^2$/s. Although the polymers which are useful in the present invention are predominantly linear polymers, small amounts of trivalent or tetravalent units of the respective formulae $ZSiO_{3/2}$ and $SiO_2$ may also be present, causing a certain amount of branching to occur in the polymers.

Component (ii) resins are MQ resins consisting essentially of units of the general formula $R_aR'_{3-a}SiO_{\frac{1}{2}}$ and $SiO_{4/2}$, wherein R denotes an alkyl or aryl group having from 1 to 8 carbon atoms, R' is a group of the general formula $-R''Si(OR^*)_3$, wherein R'' is a divalent alkylene group having up to 10 carbon atoms in the chain linking the two silicon atoms together, $R^*$ denotes an alkyl group having from 1 to 8 carbon atoms and a has a value of 2 or 3, there being at least one R' group per molecule. It is preferred that the ratio of monovalent (M) units ($R_aR'_{3-a}SiO_{\frac{1}{2}}$) over tetravalent (Q) units ($SiO_2$) is in the range of 0.4:1 to 2:1, more preferably 0.7:1 to 1.8:1. It is preferred that the M:Q ratio is such that the resin is liquid at ambient temperature and atmospheric pressure. These resins usually have a M:Q ratio which is greater than 1:1, preferably greater than 1.2:1.

The R groups are alkyl or aryl groups, preferably alkyl with a short carbon chain, e.g. ethyl, propyl or isopropyl but most preferably substantially all R groups are methyl groups. The group R″ may be any divalent alkykene group which links the two silicon atoms with up to 10 carbon atoms. Most preferred are those alkylene groups linking the silicon atoms with 2 or 3 carbon atoms for example the dimethylene and propylene group. Each OR* group in the R′ substituent is an alkoxy group having up to 8 carbon atoms, e.g. methoxy, ethoxy, propoxy and butoxy. Preferably the OR groups are all the same, and most preferably they are methoxy groups. At least one R′ group must be present in each molecule. It is however preferred that in from 0.1 to 30% of all monovalent units of the resin a has a value of 2. This gives the resin sufficient reactivity to be useful as e.g. cross-linking centres for the elastomer-forming compositions of the invention. A small number of the monofunctional units, preferably less than 3%, may have the general formula $-O_{\frac{1}{2}}SiR_2OY$, wherein Y represent hydrogen or R.

The MQ resins suitable for use in compositions of the present invention may be made by reacting MQ resins which consist essentially of units of the general formulae $R_aH_{3-a}SiO_{\frac{1}{2}}$ and $SiO_{4/2}$, wherein R denotes an alkyl or aryl group having up to 8 carbon atoms and a has a value of 2 or 3, provided that at least one silicon-bonded hydrogen atom is present per molecule with silanes of the general formula $XSi(OR^*)_3$, wherein X represents an unsaturated alkenyl group and R* is as defined above, in the presence of a catalyst which promotes the addition reaction between the unsaturated group and the silicon-bonded hydrogen atom, e.g. platinum based compounds.

Component (ii) can be used in amounts of from 1 part by weight per 100 parts of Component (i). The highest loading levels are dependant on the viscosity of Component (i) and on the desired viscosity of the uncured composition. Preferably no more than 150 parts by weight are used for every 100 parts by weight of Component (i). In order to provide sufficient physical strength to the cured composition it is preferred that from 20 to 100 parts of Component (ii) are used per 100 parts of Component (i).

Component (iii) of the compositions of the invention is a titanium compound which serves as a catalyst for curing the composition of the invention. It may be a titanium chelate or a soluble organotitanate having titanium-oxygen bonds. Such compounds include for example tetraethyltitanate, tetra-n-butyl titanate, tetra-2-ethylhexyl titanate, triethanolamine titanate, ethylene glycol titanate. Preferred titanium compounds include $[(CH_3)_2CHO]_4Ti$ (TPT), $(C_4H_9O)_4Ti$ (TBT) and $[(CH_3)_2CHO]_2Ti[CH_3C(O)=CH(O)OC_2H_5]_2$ (TDIDE). The latter gives a composition which is able to cure to an elastomer in a relatively short time whilst TPT and TBT are slightly slower as catalysts. However, it was found that the shelf stability of compositions wherein Component (i) was an α, ω hydroxyl end-blocked polydiorganosiloxane and Component (iii) TPT or TBT was reduced. TPT used in combination with the polymer (i) which had an alkylene trialkoxy group in terminal position, preferably an ethylenetrimethoxy group, gave a composition with very good shelf life. It was further noticed that the use of TDIDE or TBT resulted in a composition with a yellow colour, or yellowish shade, whilst the use of TPT was preferred for those compositions which were intended to have a clear appearance. The preferred clear system giving a shelf stable elastomer-forming composition would, therefore, use a diorganosiloxane polymer having alkylene trialkoxy end groups in combination with TPT. Preferably from 0.1 to 5% by weight of the compound is used based on the weight of Component (i).

The compositions of the invention may also contain small amounts of unreacted MQ resins used in the preparation of the alkoxy functional resins and other ingredients which are known as components of elastomer-forming compositions. These include fillers, e.g. calcium carbonate, silica and quartz, pigments, preservatives, adhesion promoters, e.g. silanes having epoxy and/or alkoxy functional substituents for example trimethoxy glycidoxy silane, cure inhibitors and extenders such as trimethyl silyl endblocked polydimethyl siloxanes.

The compositions of the invention are capable of curing to elastomers at room temperature. However, curing may be accelerated if desired by the use of elevated temperatures. As the compositions of the invention cure to an elastomer at room temperature under the influence of atmospheric moisture, they are preferably packaged in a container which is sufficiently impermeable to water to avoid premature curing. The compositions of the invention may be prepared by mixing the different components together in any order. Standard homogenisation equipment can be used, e.g. mixers and blenders.

The compositions of the invention are particularly useful as self levelling sealants and as potting compounds e.g. for electronic systems.

There now follows a number of examples which illustrate the invention. All parts and percentages are expressed by weight.

EXAMPLE 1

A MQ resin was prepared having a molecular weight of 1250 and a ratio of $M:M^h:Q$ of 1.4:0.4:1, wherein M denotes a group of the formula $(CH_3)_3SiO_{\frac{1}{2}}$, $M^h$ has the formula $H(CH_3)_2SiO_{\frac{1}{2}}$ and Q has the formula $SiO_{4/2}$. The resin had 6.2% SiH and a viscosity of 84 mm²/s.

200g of the MQ resin thus prepared was loaded into a mixture of 0.64g of a platinum complex and 75g of toluene. The amount of catalyst was calculated to give $5 \times 10^{-5}$ mole of Pt per mole of —SiH. The mixture was heated to 95° C., after which 75.78g of vinyltriethoxy silane was added which gives 18 mole% excess. , small exothermic reaction was observed. The mixture was then heated to 124° C. and maintained at that temperature for one hour. When cooled to room temperature the degree of conversion was determined by measuring the absorbance peak for SiH in infrared spectrometry as 98.2%. The mixture was then stripped under reduced pressure (6 mbar) at 102° C. for 30 minutes followed by filtration through a 5 micron membrane. The resulting resin has a ratio for $M:M^aQ$ of 1.4:0.4:1, wherein M and Q are as defined above and $M^a$ is $(CH_3O)_3Si(CH_2)_2(CH_3)_2SiO_{\frac{1}{2}}$. NMR spectrometer data showed a value of 14.3% MeO, 3.0% $CH_2CH_2$ and 27.9% silicon-bonde methyl (compared with 14.3, 4.3 and 28.9% theoretical value ). The resin was a clear nearly water white liquid having a molecular weight of 1233. After storage for 10 weeks the viscosity had not changed giving a value of 100.5 mm2/s.

33.5 parts of the MQ resin so prepared were mixed with 63.5 parts of an α,ω dihydroxyl end-blocked polydimethyl siloxane having a viscosity of about 13.5 Pa.s, 1.3 parts of trimethoxy glycidoxy ilane and 1.8 parts of a titanium complex having the formula [(CH$_3$)$_2$CHO]$_2$-Ti-[CH$_3$C(O)=CHC(O)OCH$_2$CH$_3$]$_2$. The composition had a viscosity of 19Pa.s, compared with 35Pa.s for a commercially available flowable siloxane sealant based on a mixture of α,ω dihydroxyl end-blocked polydimethyl siloxane, treated fumed silica and tetrabutyl titanate. When both the example composition and the commercial sealant were cured, they were tested for Shore A hardness, elongation at break, tensile strength and modulus. A third comparative composition, which was the same as the example composition, but without the M! resin, which had a viscosity before cure of 15 Pa.s, w s cured and tested alongside. Test results are given n the Table below.

TABLE

|  | Example Composition | Commercial Sealant | Comparative Composition |
| --- | --- | --- | --- |
| Shore A Hardness | 29 | 25 | 8 |
| Elongation (%) | 290 | 350 | 80 |
| Tensile (MPa) | 2.75 | 2.00 | 0.30 |
| Modulus (MPa) | 0.80 | 0.50 | — |

It can be seen from the test results that although compositions according to the invention have a lower viscosity than commercially available flowable siloxane sealant compositions, they do not produce elastomers with inferior mechanical properties.

EXAMPLES 2 and 3

48.3 parts (Example 2) a: d 59.8 parts (Example 3) of the MQ resin, as prepared in Example 1, were mixed with 48.3 parts and 59.8 parts respectively of the α, ω hydroxyl end-blocked polydimethyl siloxane used in the composition prepared in Example 1, 1.4 par s and 1.8 parts respectively of trimethoxy glycidoxy silane and 2.0 parts and 2.4 parts respectively of the titanium complex used in Example 1. The composition of Example 2 had a viscosity of 9 Pa.s, whilst the composition of Example 3 had a viscosity of 4 Pa.s at 25° C. After curing the compositions they were tested as for Example 1. The following results were obtained.

|  | Example 2 | Example 3 |
| --- | --- | --- |
| Shore A Hardness | 45 | 56 |
| Elongation (%) | 160 | 100 |
| Tensile (MPa) | 2.6 | 3.5 |
| Modulus (MPa) | 1.75 | 3.5 |

It follows from these examples that an increase in the MQ resin (Component ii) results i. a lower viscosity, greater hardness, lower elongation and higher modulus.

EXAMPLES 4 AND 5

33.5 parts of the MQ resin, as prepared in Example 1, were mixed with 63.4 parts of he e,w hydroxyl end-blocked polydimethyl siloxane used in he composition prepared in Example 1, 1.3 parts of trimethyloxy glycidoxy silane and 1.8 parts of tetrapropyltitanate o tetrabutyltitanate respectively for Examples 4 and 5. The composition of Example 4 had a viscosity of 15 Pa.s, whilst the composition of Example 5 had a viscosity of 1 Pa.s at 25° C. After curing the compositions they were tested as for Example 1. The following results were obtained.

|  | Example 4 | Example 5 |
| --- | --- | --- |
| Shore A Hardness | 26 | 25 |
| Elongation (%) | 230 | 270 |
| Tensile (MPa) | 1.7 | 2.0 |
| Modulus (MPa) | 0.7 | 0.7 |

EXAMPLES 6 AND 7

33.5 parts of the MQ resin, as prepared in Example 1, were mixed with 627 parts of α, ω hydroxyl trimethoxysilyl end-blocked polydimethyl siloxane having a viscosity of 20 Pa.s (Example 6) or 62.7 parts of α, ω(CH$_3$O)$_3$Si(CH$_2$)$_2$Si(CH$_3$)$_2$OSi(CH$_3$)$_2$(CH$_2$)$_2$ end-blocked polydimethylsiloxane having a viscosity of about 65 Pa.s (Example 7), 1.3 parts of trimethoxy glycidoxy silane and 2.5 parts of tetrapropyltitanate. The composition of Example 6 had a viscosity of 6 Pa.s at 25° C., whilst the composition of Example 7 had a viscosity of 2 Pa.s at 25° C. After curing the compositions they were tested as for Example 1. The following results were obtained.

|  | Example 6 | Example 7 |
| --- | --- | --- |
| Shore A Hardness | 38 | 38 |
| Elongation (%) | 270 | 400 |
| Tensile (MPa) | 3.4 | 4.0 |
| Modulus (MPa) | 1.3 | 0.9 |

The compositions of Examples 1 4, 5, 6 and 7 were all heat aged to test shelf stability equivalent to 1 year at room temperature. Only Examples 4 and 5 failed this test.

That which is claimed is:

1. An organosilicon composition which upon curing forms an elastomer comprising (i) 100 parts by weight of a diorganopolysiloxane of which each terminal group has the general formula —Si(Z)$_2$Q, wherein each Z denotes an organic group consisting of C, H and optionally O atoms and Q is selected from the group consisting of —OH, —OSi(OR*)$_3$, —R"Si(OR*)$_3$ and —R"Si(Z)$_2$OSi(Z)$_2$R"Si(OR*)$_3$ wherein R" is a divalent alkylene group having up to 10 carbon atoms in the chain linking the two silicon atoms together, R* is an alkyl group having up to 8 carbon atoms, said diorganopolysiloxane having a viscosity of from 10$^{-4}$ m$^2$/s to 10 m$^2$/s, (ii) 1 to 150 parts by weight of an MQ resin consisting essentially of tetravalent units of the general formula SiO$_{4/2}$ and monovalent units of the general formula R$_a$R'$_{3-a}$SiO$_{1/2}$ wherein R is selected from the group consisting of alkyl and aryl groups having from 1 to 8 carbon atoms, R' is a group of the general formula —R"Si(OR*)$_3$ wherein R" and R* are as defined above and a has the value of 2 or 3, there being at least one R' group per molecule and (iii) a titanium catalyst.

2. An organosilicon composition according to claim 1 wherein in Component (ii) from 0.1 to 30% of all monovalent units have a value of a=2.

3. An organosilicon composition according to claim 1 wherein in Component (ii) the ratio of monovalent units to tetravalent units is from 0.4:1 to 2:1.

4. An organosilicon composition according to claim 3 wherein in Component (ii) the ratio of monovalent units to tetravelent units is greater than 1.2:1.

5. An organosilicon composition according to claim 1 wherein in Component (ii) each R" is a dimethylene group and each R* is a methyl group.

6. An organosilicon composition according to claim 1 wherein Component (i) has a viscosity at 25° C. of from $10^{-3}$ m²/s to 0.1 m²/s.

7. An organosilicon composition according to claim 1 wherein Component (i) is an α, ω hydroxyl end-blocked polydiorgano siloxane and the titanium compound has the formula $[(CH_3)_2CHO]_2Ti[CH_3C(O)=CH(O)C_2H_5]_2$.

8. An organosilicon composition according to claim 7 wherein Component (i) is an c,w hydroxyl enblocked polydimethyl siloxane and the titanium compound has the formula $[(CH_3)_2CHO]_2Ti[CH_3C(O)=CH(O)C_2H_{52}$.

9. An organosilicon composition according to claim 1 wherein Component (i) is an α, 107 -R"Si(Z)$_2$OSi(Z)$_2$R"Si(OR*)$_3$ end-blocked polydiorgano siloxane and the titanium compound is tetrapropyltitanate.

10. An organosilicon composition according to claim 9 wherein Component (i) is an α, ω-R"Si(Z)$_2$OSi(Z)$_2$R"Si(OR*)$_3$ end-blocked polydimethyl siloxane and the titanium compound is tetrapropyltitanate.

11. An organosilicon composition according to claim 1 which comprises from 20 to 100 parts by weight of Component (ii) per 100 parts by weight of Component (i).

12. An organosilicon composition according to claim 1 wherein the catalyst is an organotitanate having titanium-oxygen bonds.

* * * * *